United States Patent
Nishiyama et al.

[11] Patent Number: 5,397,753
[45] Date of Patent: Mar. 14, 1995

[54] NONREDUCIBLE DIELECTRIC CERAMIC COMPOSITION

[75] Inventors: Toshiki Nishiyama; Yukio Hamaji, both of Nagaokakyo, Japan

[73] Assignee: Murata Manufacturing Co., Ltd., Kyoto, Japan

[21] Appl. No.: 178,124

[22] Filed: Jan. 6, 1994

[30] Foreign Application Priority Data

Jan. 8, 1993 [JP] Japan .................................. 5-018161

[51] Int. Cl.⁶ ............................................. C04B 35/46
[52] U.S. Cl. .................................... 501/138; 501/32; 501/139
[58] Field of Search ........................... 501/138, 139, 32

[56] References Cited

U.S. PATENT DOCUMENTS

| | | | |
|---|---|---|---|
| 4,859,641 | 8/1989 | Fujino et al. | 501/136 |
| 5,103,369 | 4/1992 | Saito et al. | 501/138 |
| 5,202,814 | 4/1993 | Kohno et al. | 501/139 |
| 5,204,301 | 4/1993 | Ohkubo et al. | 501/136 |
| 5,268,342 | 12/1993 | Nishiyama et al. | 501/139 |

FOREIGN PATENT DOCUMENTS 61-14611 4/1986 Japan .
63-103861 5/1988 Japan .

*Primary Examiner*—Mark L. Bell
*Assistant Examiner*—Deborah Jones
*Attorney, Agent, or Firm*—Ostrolenk, Faber, Gerb & Soffen

[57] ABSTRACT

A nonreducible dielectric ceramic composition consists essentially of: a primary component consisting essentially of 92.0 to 99.4 mol % of $BaTiO_3$, 0.3 to 4.0 mol % of at least one of rare earth element, expressed by the general formula: $Re_2O_3$, where Re is at least one rare earth element selected from the group consisting of Tb, Dy, Ho and Er, and 0.3 to 4.0 mol % of $Co_2O_3$; a secondary component consisting essentially of BaO, MnO, MgO, and $BaZrO_3$, the content of the secondary component being, per 100 moles of the primary component, 0.2 to 4.0 moles for BaO, 0.2 to 3.0 moles for MnO, 0.5 to 5 moles for MgO, and 0.5 to 4.0 moles for $BaZrO_3$; and a vitreous component of a $BaO$—$SrO$—$Li_2O$—$SiO_2$ system, the content of the vitreous component being 0.5 to 2.5 parts by weight per 100 parts by weight of the sum of the primary and secondary components.

10 Claims, No Drawings

NONREDUCIBLE DIELECTRIC CERAMIC COMPOSITION

BACKGROUND OF THE INVENTION

1. Field of the Invention

The present invention relates to a non-reducible dielectric ceramic composition and, more particularly, a non-reducible dielectric ceramic composition used as a dielectric material for monolithic ceramic capacitors employing a base metal such as nickel as a material for internal electrodes.

2. Description of the Prior Art

As a dielectric material for monolithic ceramic capacitors, there have been used those mainly comprising barium titanate. Such dielectric ceramic compositions of the prior art have the a property that they are reduced considerably when fired in a neutral or reducing atmosphere with a low partial oxygen pressure, resulting in occurrence of semiconductorization of the ceramic composition. For this reason, it is required to use noble metals (e.g., palladium, platinum, etc.) which do not melt even if subjected to a high temperature at which a dielectric ceramic material sinters, and does not oxidize even if fired in an atmosphere with a high partial pressure of oxygen which does not semiconductorize the dielectric ceramic material.

However, use of such noble metals becomes a barrier to cut down the production cost of monolithic ceramic capacitors. For example, the cost of internal electrodes occupies about 30 to 70% of the production cost of monolithic ceramic capacitors.

For the reasons mentioned above, it is preferred to use a base metals such as Ni, Fe, Co, W and Mo. However, if such base metals are used as a material for internal electrodes, and fired in the conventional firing conditions of the dielectric ceramic materials, they oxidize easily and loose functions as the internal electrodes. Thus, in order to use such a base metal as a material for internal electrodes of monolithic ceramic capacitors, it is required to use a dielectric ceramic material which is never semiconductorized even if fired in a neutral or reducing atmosphere with a low partial pressure of oxygen, and which has a sufficient specific resistance and good dielectric properties.

To meet such requirements, there have been proposed some nonreducible dielectric ceramic materials such as, for example, those having a composition of a $BaTiO_3$—$MnO$—$MgO$—Rare earth element system disclosed in JP-A-63-103861, or those having a composition of a $BaTiO_3$—$(Mg, Zn, St, Ca)O$—$B_2O_3$—$SiO_2$ system disclosed in JP-B-61-146110.

However, the nonreducible dielectric ceramic composition of JP-A-63-103861 is of no practical use as the insulation resistance and the temperature coefficient of dielectric constant are affected (sensitive) by grain size of the main component $BaTiO_3$, thus making it difficult to control the composition to obtain stable dielectric properties.

On the other hand, the nonreducible dielectric ceramic composition of JP-B-61-14611 has a dielectric constant of 2000 to 2800 and thus is inferior in dielectric properties to the conventional dielectric ceramic composition with a dielectric constant of about 3000 to 3500 which has been used as a dielectric material for monolithic ceramic capacitors employing noble metals such as Pd. Thus, such a composition cannot replace the conventional dielectric material for the purpose of reducing the cost of monolithic ceramic capacitors since it has disadvantages in miniaturization and capacitance increment of capacitors.

Further, the temperature coefficient of dielectric constant (T.C.C.) of the above composition is ±10% over a range of temperatures ranging from −25° to 80° C., which is based on the capacitance at 20° C. as a standard. Such a composition meets the characteristics B specified by JIS. However, the temperature coefficient of dielectric constant becomes more than 10% at temperatures exceeding 85° C., so that it out of X7R characteristics defined in EIA.

Also, all the nonreducible dielectric compositions of the prior art including the above compositions are low in insulation resistance, which becomes an obstacle to reduce the thickness of dielectric ceramic layers.

SUMMARY OF THE INVENTION

It is therefore a main object of the present invention to provide a nonreducible dielectric ceramic composition which has a large dielectric constant of 3000 and above, a large insulation resistance (given as the product of insulation resistance and CR) of 6000 and above, meets the requirement to have a temperature coefficient of capacitance in the range of ±15%, based on the capacitance at 25° C. as a standard, over a range of temperatures ranging from −55° to 125° C., and makes it possible to produce monolithic ceramic capacitors having dielectric ceramic layers with a thickness of 10 μm or below, and can be fired in an atmosphere with a low partial pressure of oxygen without causing semiconductorization thereof.

According to the present invention, there is provided a nonreducible dielectric ceramic composition consists essentially of:

a primary component consisting essentially of 92.0 to 99.4 mol % of $BaTiO_3$, 0.3 to 4.0 mol % of at least one of rare earth element, expressed by the general formula: $Re_2O_3$, where Re is at least one rare earth element selected from the group consisting of Tb, Dy, Ho and Er, and 0.3 to 4.0 mol % of $Co_2O_3$;

a secondary component consisting essentially of BaO, MnO, MgO, and $BaZrO_3$, the content of the secondary component being, per 100 moles of the primary component, 0.2 to 4.0 moles for BaO, 0.2 to 3.0 moles for MnO, 0.5 to 5 moles for MgO, 0.5 to 4.0 moles for $BaZrO_3$; and a glass or vitreous component of a BaO—SrO—$Li_2O$—$SiO_2$ system, the content of the vitreous component being 0.5 to 2.5 parts by weight per 100 parts by weight of the sum of the primary and secondary components.

It is preferred to use $BaTiO_3$ of which a content of inevitable impurities, essentially alkaline metal oxides, being not more than 0.04% by weight. Also, as the vitreous component, it is preferred to use those having a composition consisting of 5 to 20 mol % of BaO, 5 to 20 mol % of SrO, 2 to 45 mol % of $Li_2O$ and 30 to 70 mol % of $SiO_2$.

As the rare earth element oxide, there may be used those such as $Tb_2O_3$, $Dy_2O_3$, $Ho_2O_3$ and $Er_2O_3$. These oxides may be used alone or in combination.

The nonreducible dielectric ceramic composition of the present invention is never reduced to a semiconducting composition even if fired in a neutral or reducing atmosphere at a temperature of 1260° to 1300 °C. Also, the nonreducible dielectric ceramic composition has a high insulation resistance such that the product of insulation resistance and capacitance (CR) is more than 6000, and possesses a high dielectric constant of 3000 and above, and makes it possible to produce thin-layered monolithic ceramic capacitors with a temperature coefficient of capacitance which meets the characteristics X7R defined by EIA.

Accordingly, the nonreducible dielectric ceramic composition of the present invention makes it possible to use base metals as a material for internal electrodes of monolithic ceramic capacitors, which in turn makes it possible to reduce the cost of monolithic ceramic capacitors without causing decrease in electric characteristics, as compared with the monolithic ceramic capacitors employing, as a material for internal electrodes, a noble metal such as Pd.

The above and other objects, features and advantages of the present invention will become apparent from the following examples.

EXAMPLE

As starting materials, there were prepared three kinds of $BaTiO_3$ with a different content of impurities, rare earth elements (i.e., $Tb_2O_3$, $Dy_2O_3$, $Ho_2O_3$ and $Er_2O_3$), $Co_2O_3$, $BaCO_3$, MnO, MgO, $BaZrO_3$, and a vitreous component of a composition of a $BaO$—$SrO$—$Li_2O$—$SiO_2$ system. The content of impurities in $BaTiO_3$ were 0.03, 0.05, or 0.07 percent by weight of alkaline metal oxides. These raw materials were weighed and mixed in proportions as shown in Table 1, in which an amount of rare earth elements is listed in column of $Re_2O_3$ together with the kind of the rare earth element. Barium titanate used for specimens Nos. 1–32 was $BaTiO_3$ containing, as the impurities, 0.03 percent by weight of alkaline metal oxides, that for specimen No. 33 was $BaTiO_3$ containing, as the impurities, 0.05 percent by weight of alkaline metal oxides, and that for specimen No. 34 was $BaTiO_3$ containing 0.07 percent by weight of alkaline metal oxides.

The above vitreous component was prepared in the following manner, using $BaCO_3$, $SrCO_3$, $Li_2CO_3$, $SiO_2$ as raw materials. These materials were weighed and mixed to prepare a composition consisting of 10 mol % of BaO, 10 mol % of SrO, 30 mol % of $Li_2O$ and 50 mol % of $SiO_2$. The resultant mixture was milled by the wet process with a ball mill for 16 hours and then dried by evaporation. The resultant powder was put into an aluminum crucible, maintained at 1300° C. for 1 hour, vitrified by rapid cooling, and then ground to prepare powder of a vitreous component with particle size passing through a 200 mesh sieve screen.

The resultant mixture of the raw materials was placed in a ball mill together with a suitable amount of water and partially stabilized zirconia balls, milled for 16 hours to prepare a slurry. Then, the resultant slurry was mixed sufficiently with a suitable amount of an organic binder (polyvinyl alcohol solution) and a plasticizer, formed into a sheet by a well-known Doctor blade, dried and then cut to prepare ceramic green sheets with a thickness of 12 μm.

Each ceramic green sheet was coated by screen-printing with a conductive paste containing nickel powder as a conductive material to form a conductive layer for internal electrode. After drying, the resultant ceramic green sheets were stacked, pressed and then cut into pieces to form green units for monolithic ceramic capacitors. The green units were heated to and maintained in air at 320° C. for 5 hours with an electric furnace to remove the binder by combustion, and then fired at temperatures shown in Table 2 for 2 hours in a reducing gas stream composed of hydrogen and nitrogen in a volume ratio ($H_2/N_2$) of 3/100 and having a partial pressure of oxygen ranging from $3\times10^{-10}$ to $3\times10^{-12}$ atm, to produce monolithic ceramic capacitor units. The thickness of each dielectric ceramic layer in the resultant capacitor unit was 8 μm.

The capacitor unit was provided on both sides with silver electrodes by applying a silver paste and then baking it at 800° C. for 30 minutes in a nitrogen atmosphere to prepare a monolithic ceramic capacitor.

For each specimen, measurements were made on dielectric constant ($\epsilon$), dielectric loss (tan δ), a temperature coefficient of capacitance (TCC), and insulation resistance (log IR). $\epsilon$ and tan δ were measured under the conditions of 25° C., 1 Khz and 1 Vrms. TCC was determined over a range of temperatures ranging from −55° C. to 125° C. on the basis of the capacitance at 25° C., along with an absolute value of the maximum temperature coefficient of capacitance, i.e., $|\Delta C_t/C_{25}|_{max}$, within the range of −55° C. to 125° C. TCC was given by the equation, $TCC=\Delta C_t/C_{25}$, where $\Delta C_t$ is difference between capacitance measured at −55° C. or 125° C. and that measured at 25° C., and $C_{25}$ is a capacitance at 25° C. The insulation resistance was measured at 25° C. after applying a direct current voltage of 16 V to the specimen for 120 seconds.

Results are shown in Table 2 in which the insulation resistance is given as the product of insulation resistance and capacitance (CR). In Tables 1 and 2, specimens with an asterisk are those employing a dielectric ceramic composition out of the scope of the present invention.

TABLE 1

| No. | Primary component (mol %) | | | Secondary component (mol per 100 mol of primary component) | | | | vitreous component (wt %) |
|---|---|---|---|---|---|---|---|---|
| | $BaTiO_3$ | $Re_2O_3$ | $CO_2O_3$ | BaO | MnO | MgO | $BaZrO_3$ | |
| 1 | 97.0 | $Dy_2O_3$ 1.5 | 1.5 | 1.5 | 1.0 | 1.0 | 1.0 | 1.0 |
| 2 | 99.0 | $Dy_2O_3$ 0.5 | 0.5 | 1.5 | 1.0 | 1.0 | 1.0 | 1.0 |
| 3* | 99.6 | $Dy_2O_3$ 0.2 | 0.2 | 1.5 | 1.0 | 1.0 | 1.0 | 1.0 |
| 4* | 90.0 | $Dy_2O_3$ 5.0 | 5.0 | 1.5 | 1.0 | 1.0 | 1.0 | 1.0 |
| 5 | 93.0 | $Dy_2O_3$ 3.0 | 4.0 | 1.5 | 1.0 | 1.0 | 1.0 | 1.0 |
| 6 | 96.5 | $Ho_2O_3$ 1.5 | 2.0 | 2.0 | 1.0 | 2.0 | 1.0 | 1.0 |
| 7 | 96.5 | $Ho_2O_3$ 1.5 | 2.0 | 0.5 | 1.5 | 2.0 | 1.0 | 1.0 |
| 8 | 96.5 | $Ho_2O_3$ 1.5 | 2.0 | 0.3 | 1.5 | 2.0 | 1.0 | 1.0 |
| 9* | 96.5 | $Ho_2O_3$ 1.5 | 2.0 | 0.1 | 1.5 | 2.0 | 1.0 | 1.0 |
| 10 | 96.5 | $Ho_2O_3$ 1.5 | 2.0 | 3.0 | 1.5 | 2.0 | 1.0 | 1.0 |
| 11 | 96.5 | $Ho_2O_3$ 1.5 | 2.0 | 4.0 | 1.5 | 2.0 | 1.0 | 1.0 |
| 12* | 96.5 | $Ho_2O_3$ 1.5 | 2.0 | 5.0 | 1.5 | 2.0 | 1.0 | 1.0 |
| 13 | 97.5 | $Er_2O_3$ 1.0 | 1.5 | 1.5 | 2.5 | 3.0 | 2.0 | 1.0 |
| 14 | 97.5 | $Er_2O_3$ 1.0 | 1.5 | 1.5 | 3.0 | 3.0 | 2.0 | 1.0 |
| 15* | 97.5 | $Er_2O_3$ 1.0 | 1.5 | 1.5 | 3.5 | 3.0 | 2.0 | 1.0 |

TABLE 1-continued

| No. | Primary component (mol %) BaTiO3 | Re2O3 | Co2O3 | Secondary component (mol per 100 mol of primary component) BaO | MnO | MgO | BaZrO3 | vitreous component (wt %) |
|---|---|---|---|---|---|---|---|---|
| 16 | 97.5 | Er2O3 1.0 | 1.5 | 1.5 | 0.3 | 3.0 | 2.0 | 1.0 |
| 17* | 97.5 | Er2O3 1.0 | 1.5 | 1.5 | 0.1 | 3.0 | 2.0 | 1.0 |
| 18 | 96.5 | Er2O3 2.0 | 1.5 | 1.5 | 1.5 | 2.0 | 2.0 | 2.0 |
| 19* | 96.5 | Er2O3 2.0 | 1.5 | 1.5 | 1.5 | 2.0 | 2.0 | 3.0 |
| 20 | 96.5 | Er2O3 2.0 | 1.5 | 1.5 | 1.5 | 2.0 | 2.0 | 0.5 |
| 21* | 96.5 | Er2O3 2.0 | 1.5 | 1.5 | 1.5 | 2.0 | 2.0 | 0.3 |
| 22* | 97.5 | Tb2O3 1.5 | 1.0 | 1.5 | 1.0 | 0.2 | 3.0 | 1.5 |
| 23* | 97.5 | Tb2O3 1.5 | 1.0 | 1.5 | 1.0 | 0.4 | 3.0 | 1.5 |
| 24 | 97.5 | Tb2O3 1.5 | 1.0 | 1.5 | 1.0 | 3.0 | 3.0 | 1.5 |
| 25 | 97.5 | Tb2O3 1.5 | 1.0 | 1.5 | 1.0 | 5.0 | 3.0 | 1.5 |
| 26* | 97.5 | Tb2O3 1.5 | 1.0 | 1.5 | 1.0 | 6.0 | 3.0 | 1.5 |
| 27 | 98.0 | Dy2O3 1.0 | 1.0 | 1.5 | 1.0 | 1.5 | 3.0 | 1.5 |
| 28 | 98.0 | Dy2O3 1.0 | 1.0 | 1.5 | 1.0 | 1.5 | 4.0 | 1.5 |
| 29* | 98.0 | Dy2O3 1.0 | 1.0 | 1.5 | 1.0 | 1.5 | 4.5 | 1.5 |
| 30 | 98.0 | Dy2O3 1.0 | 1.0 | 1.5 | 1.0 | 1.5 | 0.5 | 1.5 |
| 31* | 98.0 | Dy2O3 1.0 | 1.0 | 1.5 | 1.0 | 1.5 | 0.4 | 1.5 |
| 32* | 98.0 | Dy2O3 1.0 | 1.0 | 1.5 | 1.0 | 1.5 | 0.3 | 1.5 |
| 33* | 98.0 | Dy2O3 1.0 | 1.0 | 1.5 | 1.0 | 1.5 | 1.5 | 1.5 |
| 34* | 98.0 | Dy2O3 1.0 | 1.0 | 1.5 | 1.0 | 1.5 | 1.5 | 1.5 |

TABLE 2

| No. | Sintering temperature (°C.) | $\epsilon$ | tan δ (%) | TCC $\Delta C/C_{25}$ (%) −55° C. | 125° C. | $|\Delta C/C_{25}|$ max | CR ($\Omega \cdot F$) |
|---|---|---|---|---|---|---|---|
| 1 | 1280 | 3320 | 1.8 | −2.4 | −7.6 | 8.9 | 6470 |
| 2 | 1280 | 3430 | 1.9 | −3.4 | −6.2 | 8.0 | 6620 |
| 3* | 1300 | 3510 | 1.6 | −8.7 | +20.3 | 25.2 | 6800 |
| 4* | 1280 | 2830 | 1.9 | −3.8 | −8.1 | 9.4 | 2760 |
| 5 | 1280 | 3210 | 1.8 | −3.5 | −7.9 | 9.0 | 6080 |
| 6 | 1280 | 3340 | 1.8 | −2.2 | −7.1 | 8.0 | 6510 |
| 7 | 1280 | 3270 | 1.9 | −3.1 | −7.3 | 8.2 | 6260 |
| 8 | 1280 | 3180 | 2.0 | −3.3 | −7.5 | 8.4 | 6030 |
| 9* | Unmeasurable because of semiconductorization | | | | | | |
| 10 | 1300 | 3380 | 1.9 | −4.1 | −6.8 | 7.9 | 6090 |
| 11 | 1300 | 3190 | 2.1 | −4.5 | −6.4 | 8.0 | 6040 |
| 12* | Unmeasurable because of insufficient sintering even if fired at 1360° C. | | | | | | |
| 13 | 1260 | 3280 | 1.8 | −2.1 | −7.9 | 8.7 | 6640 |
| 14 | 1260 | 3210 | 1.9 | −1.9 | −6.8 | 7.3 | 6130 |
| 15* | 1260 | 3080 | 2.1 | −1.6 | −6.5 | 7.1 | 2170 |
| 16 | 1280 | 3410 | 1.7 | −3.8 | −8.2 | 9.6 | 7240 |
| 17* | 1280 | 3230 | 2.1 | −4.1 | −8.5 | 9.9 | 630 |
| 18 | 1280 | 3110 | 1.8 | −2.6 | −9.8 | 10.7 | 6860 |
| 19* | 1260 | 2820 | 1.9 | −2.0 | −10.1 | 11.3 | 7130 |
| 20 | 1300 | 3450 | 1.8 | −3.7 | −8.4 | 9.2 | 6420 |
| 21* | 1360 | 3480 | 2.0 | −1.7 | −11.4 | 12.7 | 4130 |
| 22* | 1280 | 3360 | 1.9 | −23.6 | +26.4 | 29.5 | 4680 |
| 23* | 1280 | 3400 | 2.1 | −18.7 | +21.3 | 24.8 | 5290 |
| 24 | 1280 | 3360 | 1.8 | −3.6 | −8.2 | 9.1 | 7340 |
| 25 | 1280 | 3070 | 1.7 | −3.4 | −7.9 | 8.7 | 7860 |
| 26* | 1280 | 2790 | 1.9 | −3.1 | −7.6 | 8.4 | 3840 |
| 27 | 1280 | 3420 | 1.8 | −1.2 | −9.8 | 10.7 | 7460 |
| 28 | 1280 | 3390 | 1.8 | +0.3 | −10.8 | 13.2 | 7840 |
| 29* | 1280 | 3370 | 1.9 | +1.2 | −12.8 | 15.6 | 8270 |
| 30 | 1280 | 3390 | 1.8 | −3.3 | −8.2 | 9.1 | 6430 |
| 31* | 1280 | 3410 | 1.8 | −2.9 | −8.0 | 8.7 | 5320 |
| 32* | 1280 | 3440 | 1.6 | −3.1 | −7.9 | 8.6 | 4860 |
| 33* | 1280 | 2810 | 1.9 | −2.1 | −9.7 | 10.7 | 6230 |
| 34* | 1280 | 2660 | 2.0 | −1.9 | −10.1 | 11.6 | 6060 |

As can be seen from the results shown in Table 2, the nonreducible dielectric ceramic composition of the present invention possesses a high dielectric constant of 3000 and above, a low dielectric loss of 2.0% or below, and good temperature coefficient of capacitance which meets the requirements for R7X characteristics defined by EIA, even if made into thin layers with a thickness of 8 μm. In addition, the composition of the present invention has a high insulation resistance as the product of insulation resistance and capacitance is 6000 and above. Thus, it is possible to produce monolithic ceramic capacitors with excellent electric characteristics.

In the nonreducible dielectric ceramic composition according to the present invention, the primary component has been limited to a composition defined as above for the following reasons: If the content of $BaTiO_3$ is less than 92.0 mol % the insulation resistance and dielectric constant become lowered, like as specimen No. 4. If the content of $BaTiO_3$ exceeds 99.4 mol %, like as specimen No. 3, the temperature coefficient of capacitance becomes considerably increased at high temperatures of about the curie point and no improvement in dielectric characteristics takes place even if rare earth element and $Co_2O_3$ are added. For these reasons, the content of barium titanate has been limited to a molar percentage ranging from 92.0 to 99.4 mol %.

On the other hand, if the content of inevitable impurities, especially alkaline metal oxides, in the primary component exceeds 0.04 mol % the dielectric constant becomes lowered, like as specimens Nos. 33 and 34, thus making it difficult to put the composition into practical use. Thus, the content of inevitable impurities has been limited to 0.04 percent by weight or below.

If the content of rare earth element or $Co_2O_3$ is less than 0.3 mol % the dielectric properties are scarcely improved by the addition thereof and the temperature coefficient of capacitance becomes considerably large. If the content of rare earth element or $Co_2O_3$ is more than 4.0 mol %, the insulation resistance and dielectric constant become lowered.

The secondary component of the nonreducible dielectric ceramic composition has been limited to those defined as above for the following reasons:

If the added amount of BaO is less than 0.2 moles per 100 moles of the primary component, like as specimen No. 9, the insulation resistance becomes considerably lowered during sintering, resulting in formation of a semiconducting composition. If the added amount of BaO exceeds 4.0 moles per 100 moles of the primary component, like as specimen No. 12, the sintering property becomes lowered. Thus, the added amount of BaO has been limited to a value of not less than 0.2 moles but not more than 4.0 moles per 100 moles of the primary component.

If the added amount of MnO is less than 0.2 moles per 100 moles of the primary component, like as specimen No. 17, it does not contribute to improvement in reduction resistance of the composition and the insulation resistance becomes considerably lowered. If the added amount of MnO exceeds 3.0 moles per 100 moles of the primary component, like as specimen No. 15, the insulation resistance becomes considerably lowered. Thus, the added amount of MnO has been limited to a value ranging from 0.2 moles to 3.0 moles per 100 moles of the primary component.

If the added amount of MgO is less than 0.5 moles per 100 moles of the primary component, like as specimens Nos. 22 and 23, the addition of MgO does not contributes to improvement in insulation resistance and the insulation resistance becomes considerably lowered. In addition, the temperature characteristic curve illustrating change of the temperature coefficient of capacitance with temperature becomes a curve with single-peak and takes a large negative value exceeding −15% at lower temperatures and a large positive value exceeding +15% at higher temperatures near the curie point. If the added amount of MgO exceeds 5.0 moles per 100 moles of the primary component, like as specimen No. 26, the dielectric constant and the insulation resistance becomes lowered. Thus, the added amount of MgO has been limited to a value ranging from 0.5 moles to 5.0 moles per 100 moles of the primary component.

The reasons why the added amount of $BaZrO_3$ has been limited to a value ranging from 0.5 moles to 4.0 moles per 100 moles of the primary component are as follows. If the added amount of $BaZrO_3$ is less than 0.5 moles per 100 moles of the primary component, like as specimens Nos. 31 and 32, its addition does not contribute to improvement in insulation resistance. If the added amount of $BaZrO_3$ exceeds 4.0 moles per 100 moles of the primary component, like as specimen No. 29, the insulation resistance is much improved but the temperature coefficient of capacitance becomes large at high temperatures near the curie point.

Finally, the vitreous component has been added to the composition to lower the sintering temperature and to improve the reduction resistance of the composition. However, if the content of vitreous component in the composition is less than 0.5 percent by weight (wt. %), like as specimen No. 21, the addition of vitreous component have no effect on improvement in reduction resistance and the sintering properties. If the content of vitreous component in the composition exceeds 2.5 wt. %, like as specimen No. 19, the dielectric constant becomes lowered. Thus, the content of vitreous component has been limited to 0.5 to 2.5 wt. %.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A nonreducible dielectric ceramic composition consists essentially of:
    a primary component consisting essentially of 92.0 to 99.4 mol % of $BaTiO_3$, 0.3 to 4.0 mol % of at least one of rare earth element, expressed by the general formula: $Re_2O_3$, where Re is at least one rare earth element selected from the group consisting of Tb, Dy, Ho and Er, and 0.3 to 4.0 mol % of $Co_2O_3$;
    a secondary component consisting essentially of BaO, MnO, MgO, and $BaZrO_3$, the content of the secondary component being, per 100 moles of the primary component, 0.2 to 4.0 moles for BaO, 0.2 to 3.0 moles for MnO, 0.5 to 5 moles for MgO, and 0.5 to 4.0 moles for $BaZrO_3$; and
    a vitreous component of a $BaO$—$SrO$—$Li_2O$—$SiO_2$ system, the content of the vitreous component being 0.5 to 2.5 parts by weight per 100 parts by weight of the sum of the primary and secondary components.

2. The nonreducible dielectric ceramic composition according to claim 1 wherein the content of inevitable impurities in $BaTiO_3$ is not more than 0.04% by weight.

3. The nonreducible dielectric ceramic composition according to claim 2 said inevitable impurities in $BaTiO_3$ are alkaline metal oxides.

4. The nonreducible dielectric ceramic composition according to claim 1 wherein said vitreous component has a composition consisting essentially of 5 to 20 mol % of BaO, 5 to 20 mol % of SrO, 2 to 45 mol % of $Li_2O$ and 30 to 70 mol % of $SiO_2$.

5. The nonreducible dielectric ceramic composition according to claim 4 wherein the content of inevitable impurities in $BaTiO_3$ is not more than 0.04% by weight.

6. The nonreducible dielectric ceramic composition according to claim 5 wherein the inevitable impurities in $BaTiO_3$ are alkaline metal oxides.

7. The nonreducible dielectric ceramic composition of claim 1 in which the rare earth element is Tb.

8. The nonreducible dielectric ceramic composition of claim 1 in which the rare earth element is Dy.

9. The nonreducible dielectric ceramic composition of claim 1 in which the rare earth element is Ho.

10. The nonreducible dielectric ceramic composition of claim 1 in which the rare earth element is Er.

* * * * *